United States Patent [19]

Kimura et al.

[11] Patent Number: 4,901,813
[45] Date of Patent: Feb. 20, 1990

[54] MOTORCYCLE

[75] Inventors: Katsumi Kimura, Saitama; Masamitsu Anzawa, Tokyo; Masamichi Uchida, Tokyo; Tomohiko Akashi, Tokyo, all of Japan

[73] Assignee: Honda Giken Kogyo Kabushiki Kaisha, Tokyo, Japan

[21] Appl. No.: 225,766

[22] Filed: Jul. 29, 1988

[30] Foreign Application Priority Data

Aug. 8, 1987 [JP] Japan .................. 62-198724

[51] Int. Cl.⁴ .......................................... B62M 7/02
[52] U.S. Cl. ............................................... 180/230
[58] Field of Search ............... 180/219, 226, 227, 229, 180/230, 225; 280/204

[56] References Cited

U.S. PATENT DOCUMENTS 4,697,664 10/1987 Kohyama ...................... 180/230

FOREIGN PATENT DOCUMENTS 26089 5/1984 Japan .
9478 3/1987 Japan .
1537233 12/1978 United Kingdom ............... 180/229

OTHER PUBLICATIONS

FIG. 1 of U.S. Pat. No. 4,697,664.

*Primary Examiner*—John A. Pekar
*Attorney, Agent, or Firm*—Lyon & Lyon

[57] ABSTRACT

A motorcycle provided with a receiving chamber positioned beneath the seat includes a forwardly inclined engine and a generally horizontally disposed transmission to permit expansion of the carrying capacity of the receiving chamber. The receiving chamber rear wall, moreover, is depressed inwardly to create an external recess for extending the clearance space between the chamber and the rear wheel, as well as providing a protrusion interiorly of the chamber capable of positioning a helmet therein.

15 Claims, 14 Drawing Sheets

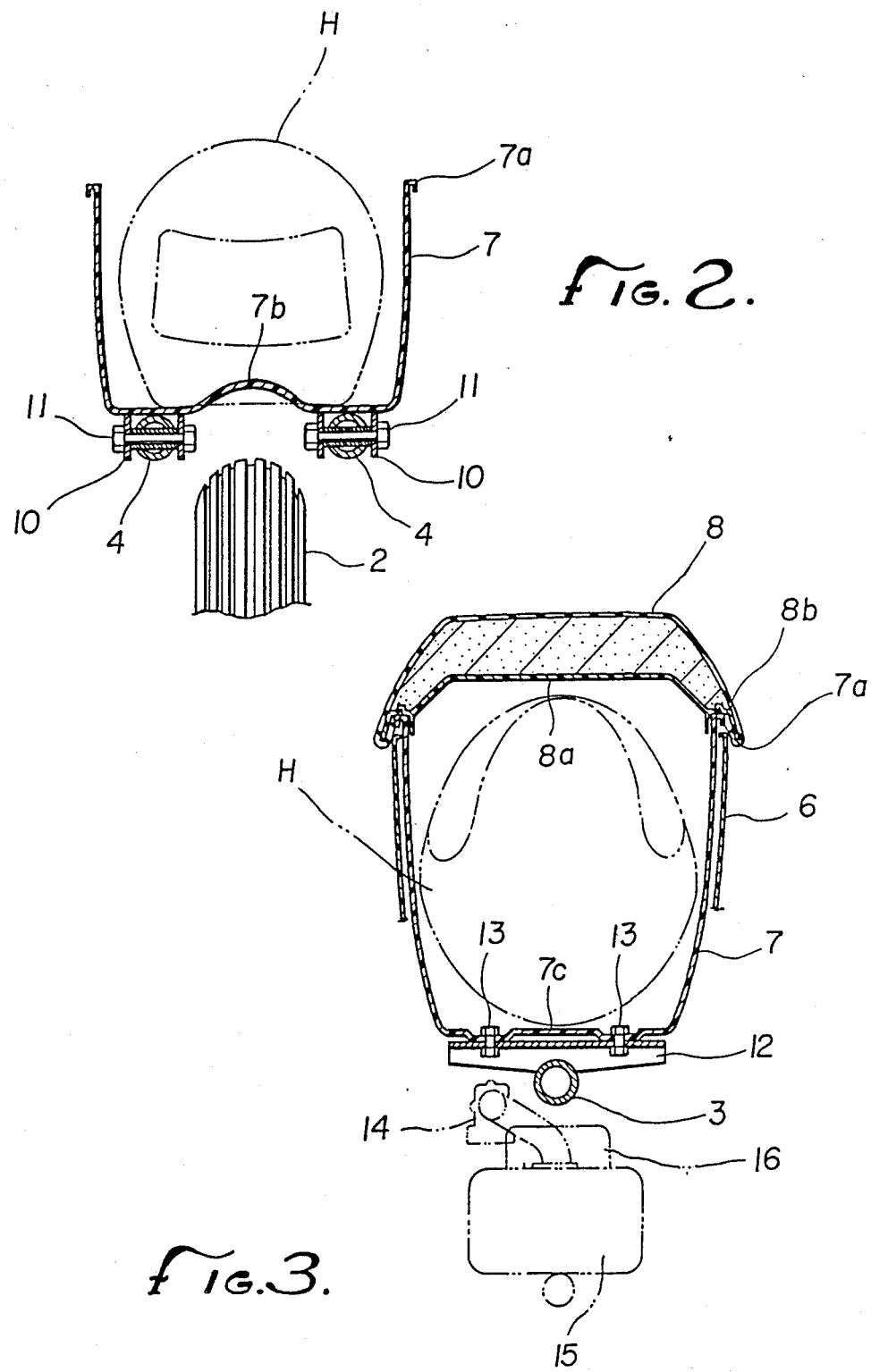

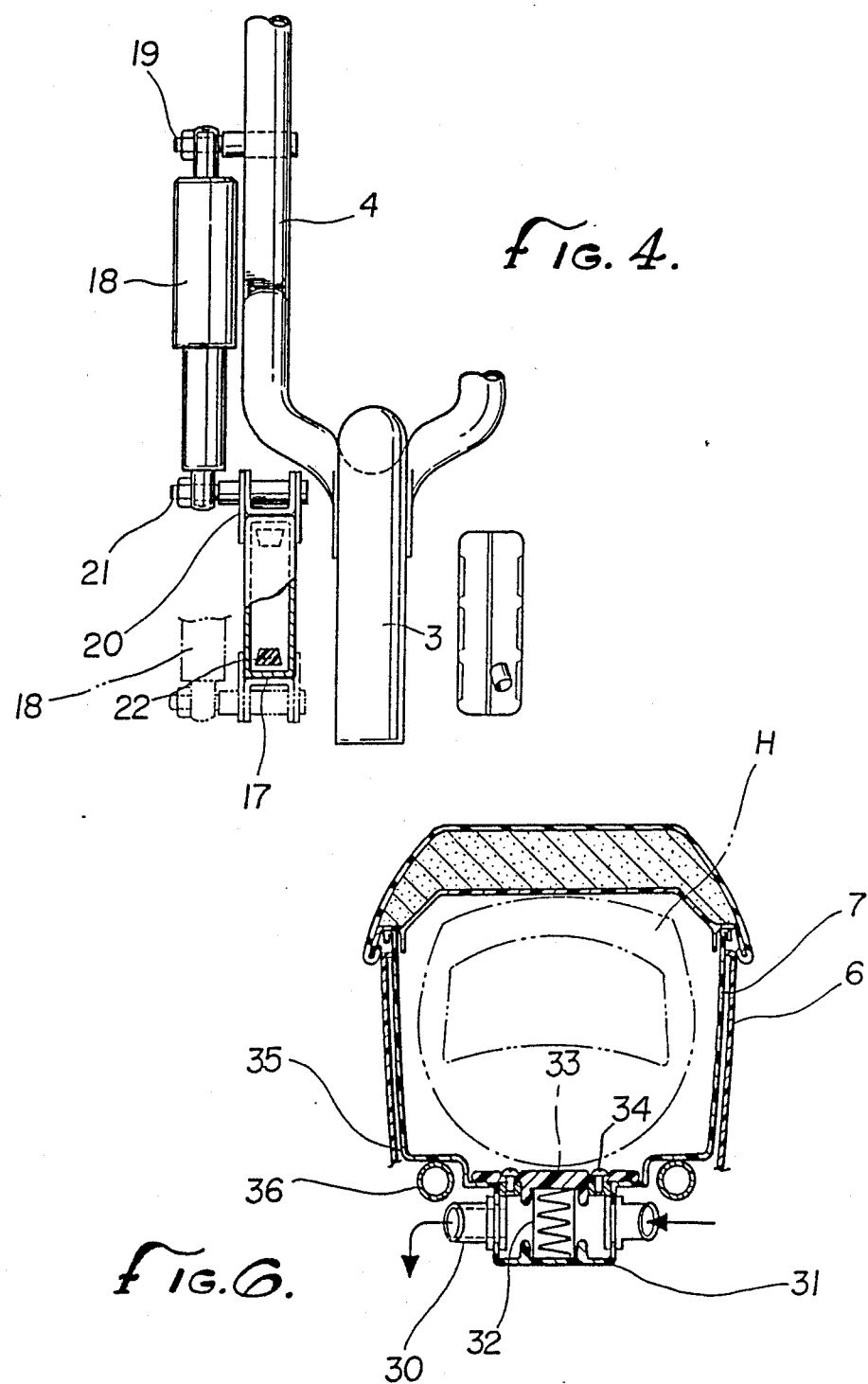

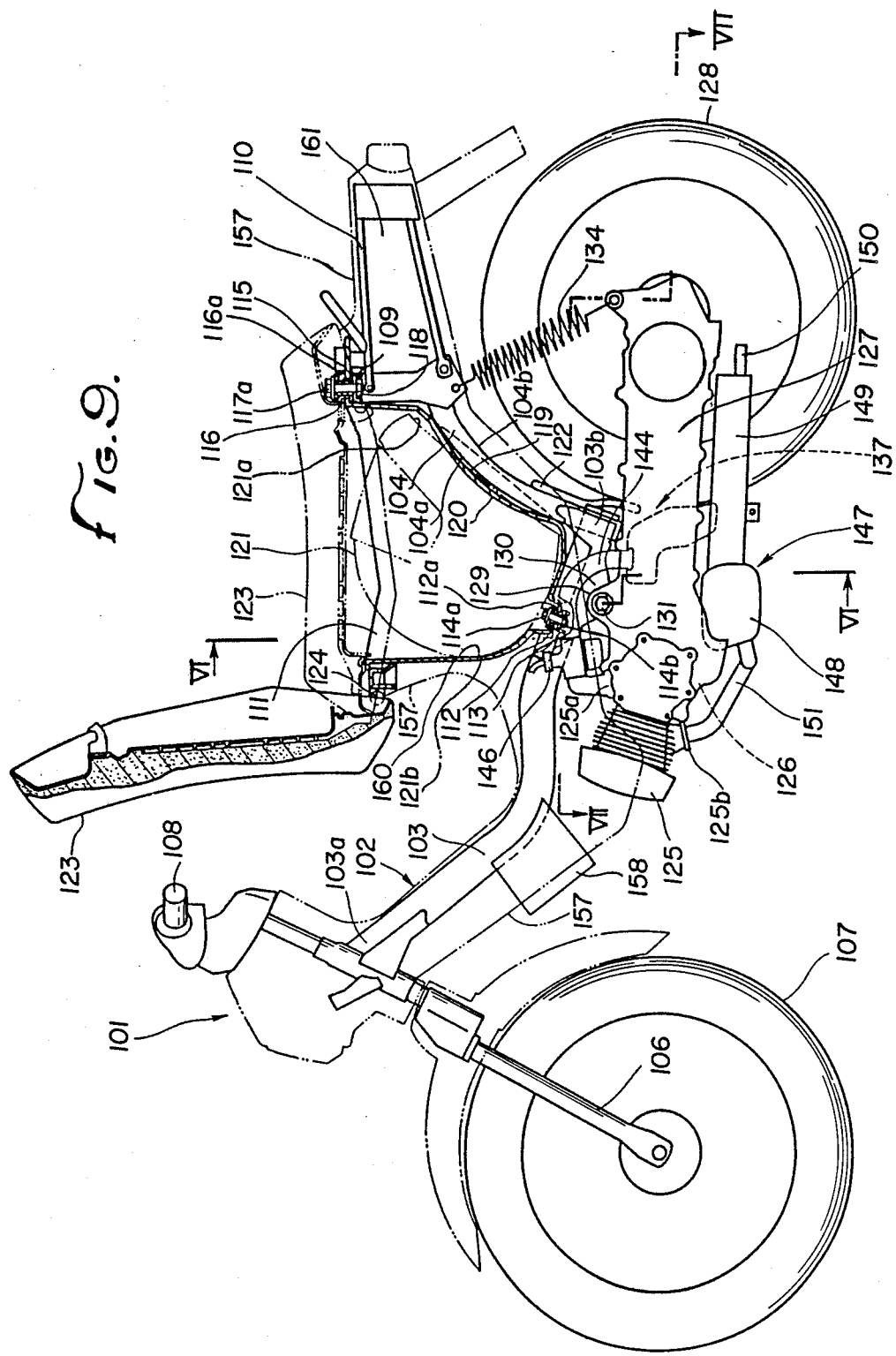

MOTORCYCLE

BACKGROUND OF THE INVENTION

This invention relates to a motorcycle provided with a receiving chamber having a relatively large capacity capable of receiving a large article, such as a helmet.

Motorcycles having a receiving chamber for a helmet, or the like, provided under the seat thereof are known. In these prior art arrangements, the engine stands substantially upright with the transmission case extending rearwardly therefrom and a substantially horizontal portion of the body frame being formed above the rear wheel. An upwardly open box-like receiving chamber is provided on the horizontal body frame portion, and a seat is mounted on the opening of the chamber so that the chamber may be opened and closed by pivoting the seat. Examples of such prior art are disclosed, for example, in Japanese Patent Publication No. 9478/1987 and Japanese Utility Model Laid-Open No. 26089/1984.

In the case of the above described construction, it is necessary to maintain adequate spacing between the approximately horizontal portion of the body frame and the engine. The height of the seat from the ground, also has a fixed limitation. Therefore, it is impossible to set the depth of the receiving chamber so deep as to obtain a large capacity. For this reason, the size of an article received into the receiving chamber naturally involves a fixed restriction. For example, it is difficult to form the receiving chamber with a capacity capable of receiving a relatively large article, such as a full-face type helmet.

Another problem encountered in such conventional prior art motorcycles is that, in the event that an attempt is made to increase the diameter of the rear wheel, steps taken to avoid interference between the receiving chamber and the rear wheel including moving the rear wheel shaft rearwardly, or raising the entire receiving chamber upwardly, or, alternatively, raising only the bottom of the receiving chamber. When the rear wheel shaft is moved rearwardly, the wheel base becomes undesirably extended. On the other hand, when the entire receiving chamber is raised upwardly, the seat, present on the upper surface of the chamber, is raised and, therefore, the height of the seat from the ground increases. When, on the other hand, only the bottom of the chamber is raised upwardly, the volume of the receiving chamber is reduced, possibly to the extent of failing to receive a helmet therein.

The present invention seeks to ameliorate the above-described problems.

SUMMARY OF THE INVENTION

The motorcycle of the present invention according to one aspect is characterized in that a forwardly inclined engine is provided and a transmission case extends approximately horizontally rearwardly therefrom between the front wheel and the rear wheel. An upwardly open box-like receiving chamber is provided in close proximity to and above the transmission case, the engine being disposed forwardly of the receiving chamber. A seat covers the opening of the receiving chamber so that the opening may be opened and closed by pivoting the seat. According to the invention, by providing the forwardly inclined engine and the transmission gear extending approximately horizontally and rearwardly therefrom are provided on the vehicle, the space formed under the seat is advantageously enlarged without the problem of the position of the seat having to be raised or the volume of the receiving chamber being restricted by the engine. Accordingly, the volume of the receiving chamber may, concomitantly, be increased.

According to another aspect of the present invention, a motorcycle having a helmet-receiving chamber below the seat is provided with a bottom plate of the receiving chamber extending obliquely rearwardly and upwardly with respect to an upward portion of the rear wheel. A recess for avoiding interference with the rear wheel is provided by the formation of a depression in the inclined portion of the bottom plate which depression extends into the interior of the receiving chamber as a protrusion. The described arrangement provides a support for positioning the lower opening of the helmet on the extended protrusion of the bottom plate.

By providing the recess in the inclined portion of the bottom plate of the receiving chamber, interference between the bottom plate and the rear wheel is avoided. Further, by the provision of a supporting structure on the bottom plate within the chamber, the lower opening of the helmet assumes a position with respect to the extended portion permitting the extended portion to extend inwardly of the helmet opening and, therefore, the helmet can be received without trouble.

It is, therefore, an object of the present invention to provide a motorcycle intended for a larger capacity of a receiving portion so that relatively large articles may be received therein.

It is another object of the present invention to provide a motorcycle of the described type which can provide for a rear wheel of increased diameter, without increasing the wheel base, or the height of the seat, or without constituting an obstacle to receiving a helmet into the receiving chamber.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 2 is a sectional view taken along line II—II of FIG. 1;

FIG. 3 is a sectional view taken along line III—III of FIG. 1;

FIG. 4 is a view looking in the direction X in FIG. 1;

FIG. 6 is a view taken along line VI—VI of FIG. 5;

FIG. 9 is a view similar to FIG. 1 illustrating a fourth embodiment of the invention;

DETAILED DESCRIPTION OF THE PREFERRED EMBODIMENTS

Figure 1:
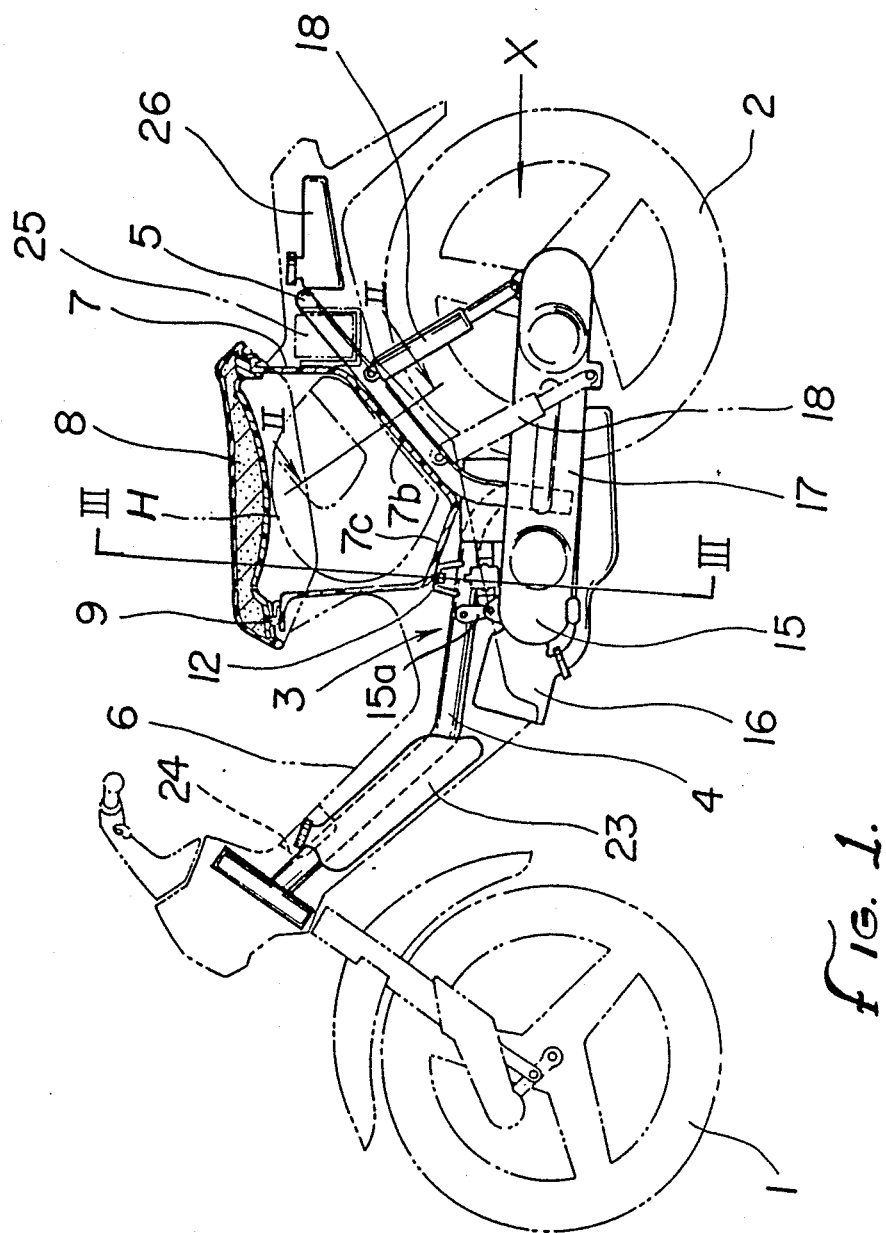
FIG. 1 is a side elevational view, partly in section, of a vehicle incorporating the present invention.

FIG. 1 to 4 show one embodiment of the present invention. This embodiment relates to a small motorcycle in which a body frame 3 is provided between a front wheel 1 and a rear wheel 2. The body frame 3 is composed of a single main frame 4 comprising a pipe having a relatively large diameter and a pair of rear frames 5 connected to the rear portion of the main frame and each comprising a pipe having a relatively small diameter. The body frame 3 is formed to be downwardly curved between the front wheel 1 and the rear wheel 2. The body frame 3 is covered with a body cover 6 made of synthetic resinous material.

On the lower curved portion of the body frame 3 is provided an upwardly open box-like receiving chamber 7, which is supported on the body frame 3. A seat 8 is mounted on the opening of the receiving chamber 7 so that one end thereof may be opened and closed by a hinge 9, also serving as a cover of the receiving chamber 7. The exterior of the receiving chamber 7 is enclosed by the body cover and is thereby hidden from sight. The upper end of the receiving chamber 7 defining the opening includes a seat receiving portion 7a that is foldedly offset and can support the bottom plate 8a of the seat. The reference numeral 8b designates a groove-like seal portion formed on the side of the seat 8 to receive the upper end of the body cover 6 thereby providing a waterproof construction.

The receiving chamber 7 is made of synthetic resin and is in the form of a strong member for supporting the loads of the seat 8 and of an occupant. It has a large capacity capable of receiving a relatively large article, such as a full-face helmet H (see FIG. 2). The bottom of the receiving chamber 7 has an approximately V-shape section whose front and rear walls rise obliquely toward the front and rear, respectively, of the vehicle. The exterior side of the rear wall 7b is provided with laterally spaced brackets 10 comprising a pair of holding elements. Each rear frame 5 is held between the holding elements of the brackets 10 and fastened by bolts 11.

The rear wall, at 7b, provides an upwardly curved and protruding shape that permits the wall to serve as a rear fender for the rear wheel 2. The forward portion of the chamber bottom 7c is fastened by bolts 13 to a bracket 12 extending perpendicularly to the main frame 4 as shown in FIG. 3. In FIG. 1, the reference numeral 14 designates a carburetor, 15 a crank case, 16 an engine, 17 a transmission case containing a transmission belt which is one example of the form of transmission contemplated by the present invention, and 18 a rear cushion unit. The engine 16 is suspended by a pivot link 15a from the main frame 4 in the state wherein the engine is forwardly disposed in a substantially horizontal attitude.

As shown in FIG. 4, the rear cushion unit 18 has its upper end mounted to one side portion of the rear frame 5 by a bolt 19 and its bottom end mounted by a bolt 21 to a substantially U-shaped bracket 20 that is mounted on the upper portion of the transmission case 17. The reference numeral 22 designates a V belt enclosed within the transmission case.

It is noted that the cushion unit 18 may, alternatively, be mounted at a lower position by supporting the lower end thereof by the lower portion of the transmission case. In this way, the rear frame 5 can be disposed more to a horizontal attitude, which is more advantageous when it is desired to have the volume of the receiving chamber 7 enlarged.

Other elements illustrated in FIG. 1 include a fuel tank 23 mounted over the main frame 4, a lid 24 formed on the body cover 6, a battery 25 and an oil tank 26.

According to the invention, the height of the seat from the ground can be made equal to, or less than, that of comparable prior art vehicles, and yet the receiving chamber 7 formed thereunder can be extended into close proximity to the transmission case 17. Thus, the interior of the chamber 7 can be formed with an extended depth to provide a capacity sufficiently great to enable reception of larger articles than that which could be received by the prior art.

In the present embodiment, since the rear wall 7b of the receiving chamber 7 is made to also serve as a rear fender, the construction of the body becomes advantageously simple.

Figure 5:
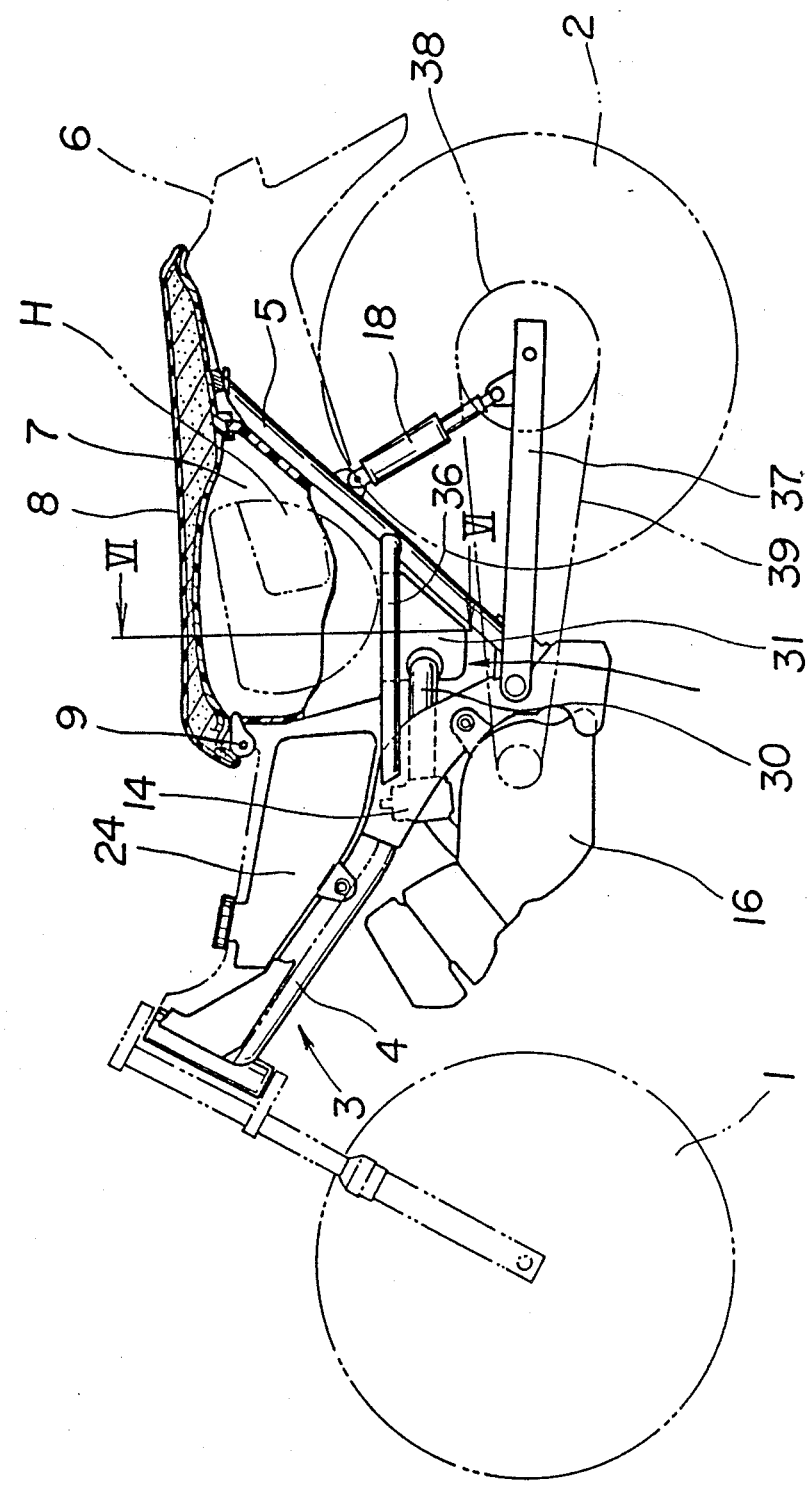
FIG. 5 is a view similar to FIG. 1 illustrating a second embodiment of the invention.

FIGS. 5 and 6 illustrate a second embodiment of the invention. This embodiment is adapted for application to larger motorcycles than the previous embodiment and will be described by applying the same reference numerals as those of the previous embodiment to the parts having the same function.

The main frame 4 is inclined rearwardly between the front wheel 1 and the rear wheel 2. The main frame 4 suspends and supports the engine 16 in a state frontwardly inclined slightly above the horizontal. A carburetor 14 connected to the engine 16 is connected to an air cleaner case 31 through a connecting tube 30.

The air cleaner case 31 is interiorly provided with a filter element 32, over which is provided a diaphragm 33, as shown in FIG. 6. The air cleaner case 31 is formed integral with the lower portion of the receiving chamber 7, and the diaphragm 33 forms the bottom thereof and, at the same time, supports the upper portion of the filter element 32. The reference numeral 34 designates bolts used to mount the diaphragm 33. It is possible to receive a relatively large full-face type helmet H in its normal vertical state or in an inverted vertical state in the described receiving chamber 7. A tandem seat 8 is mounted on the upper opening of the receiving chamber 7 so that the seat may be opened and closed by a hinge 9. Further, at the bottom of the receiving chamber 7 oppositely spaced shoulders 35 are formed adjacent the connecting portion of the air cleaner case 31 thereby permitting the chamber to be supported on a pair of left and right reinforcing pipes 36 on the shoulders 35. The rear end of the reinforcing pipes 36 are connected to an intermediate portion of the rear frame which is formed to extend obliquely from the rear end of the main frame 4 toward the rear portion of the vehicle. A rear swing arm 37 is pivotably supported on the rear end of the main frame 4, and the intermediate portion of the rear frame 5 contains a bracket connecting the upper end while the rear swing arm 37 connects the lower end of the cushion unit 18.

In FIG. 5, reference numeral 38 designates a sprocket, and 39 drive chain which illustrates another example of the transmission contemplated for use with the present invention. The reference numeral 24 designates a relatively large fuel tank.

By means of this construction, the receiving chamber 7 according to the present embodiment, is formed integral with the air cleaner case 31. Therefore, it is possible to reduce the number of parts to simplify the construction.

Figure 7:
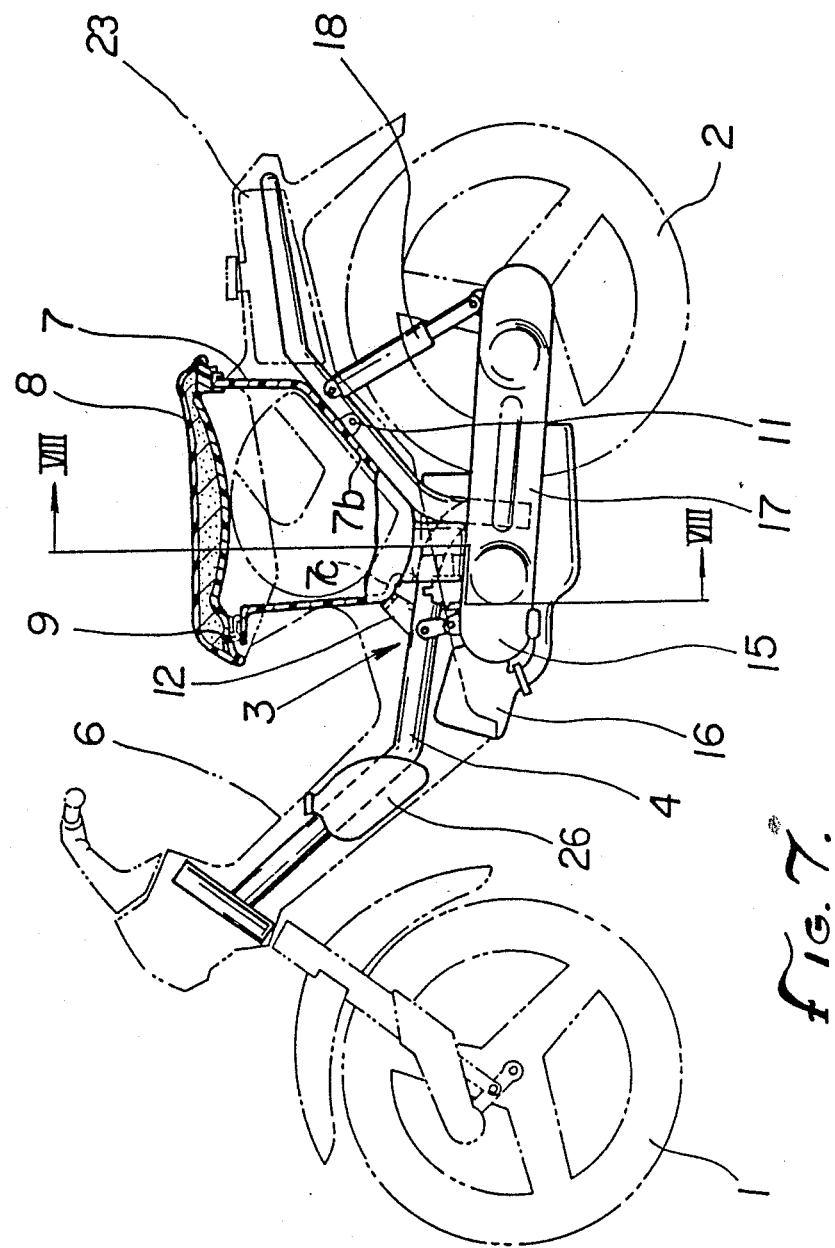
FIG. 7 is a view similar to FIG. 1 illustrating a third embodiment of the invention.
Figure 8:
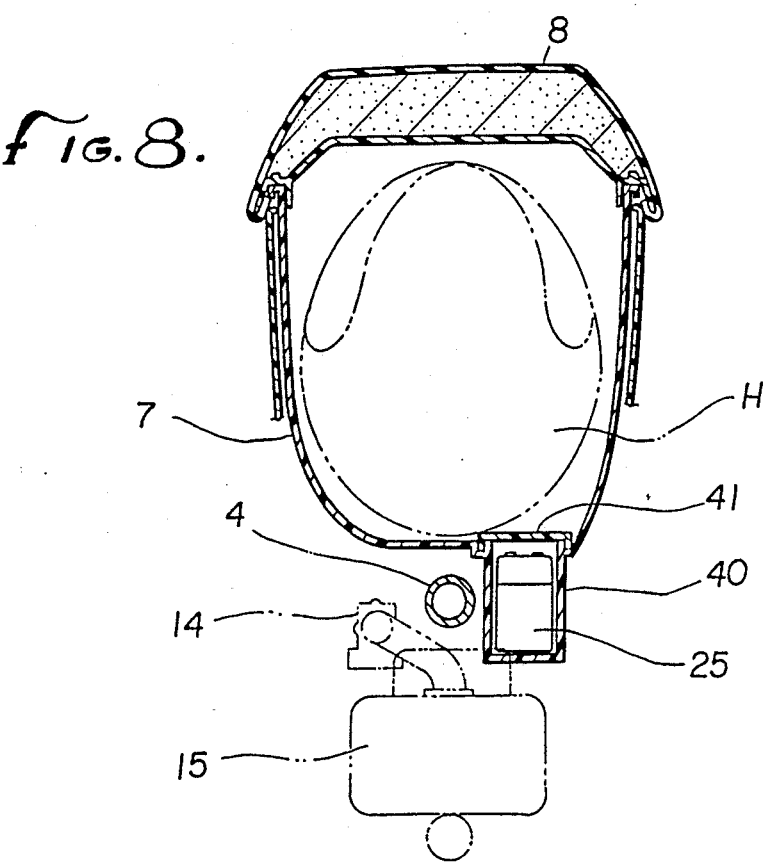
FIG. 8 is a view taken along line VIII—VIII of FIG. 7.
Figure 10:
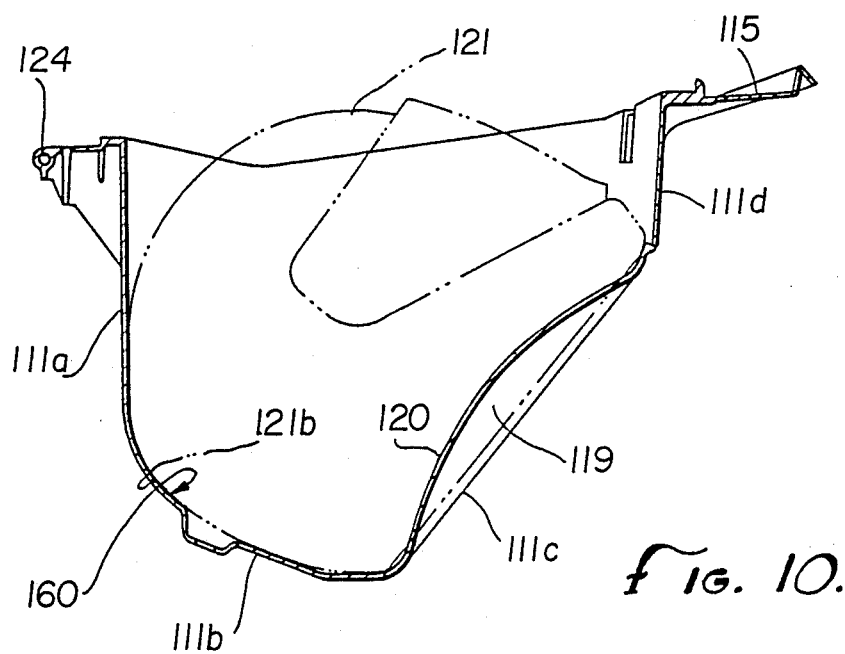
FIG. 10 is an enlarged view of a receiving chamber according to the embodiment of FIG. 9.
Figure 11:
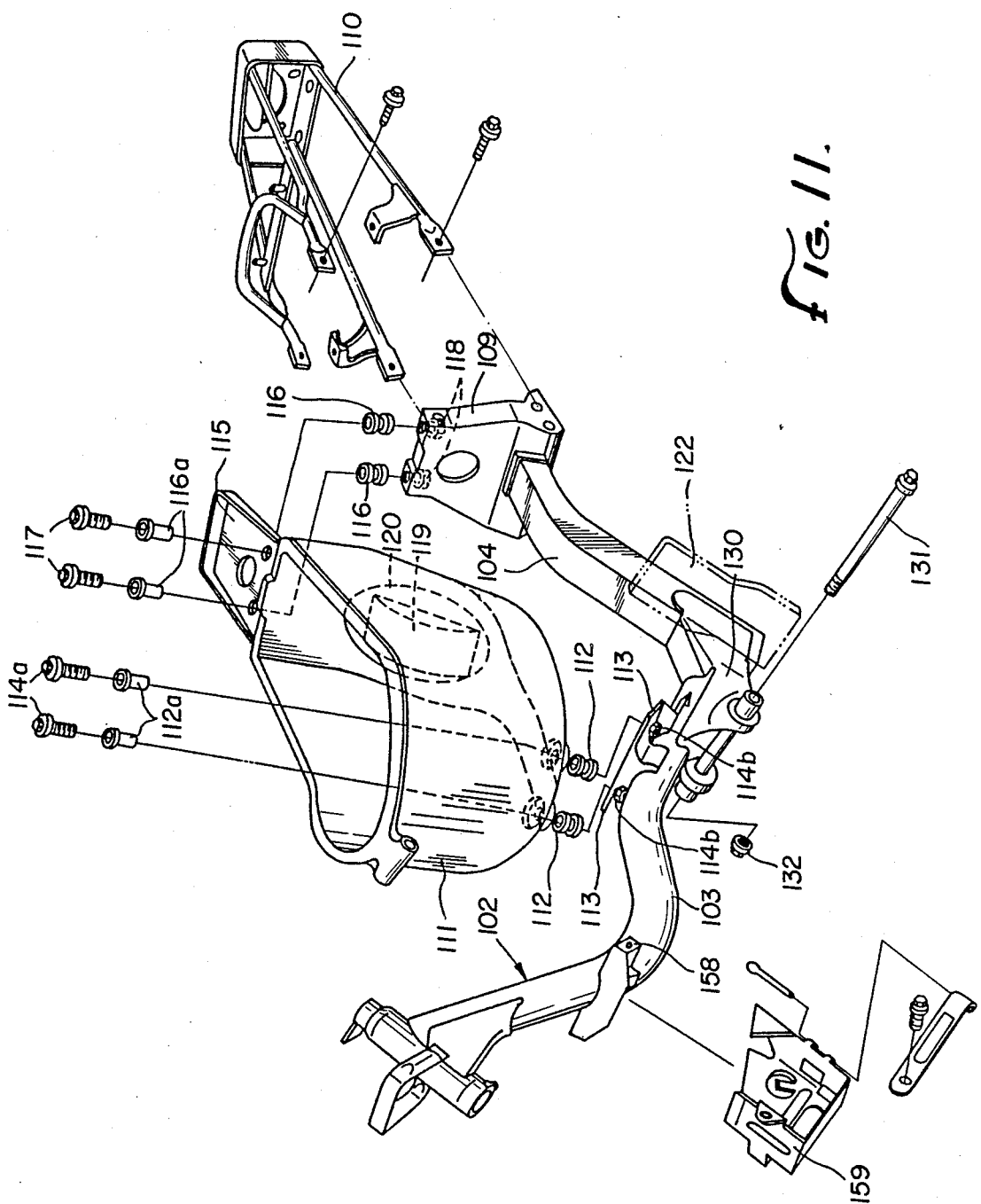
FIG. 11 is an exploded perspective view of the body frame and receiving chamber of the FIG. 9 embodiment.

FIGS. 7 to 8 show still another embodiment of the invention. In this embodiment, a battery case is formed integral with the receiving chamber 7 of the kind described in connection with the first embodiment shown in FIGS. 1 to 4. Accordingly, the description will be made using the same reference numerals for common parts. A battery case 40 is integrally projected further downwardly from a part of the bottom of the receiving chamber 7. The battery case 40 is open to the bottom of the chamber 7 and receives a battery 25. A detachable lid 41 is provided to close the opening between the chamber bottom and the battery case 40. Accordingly, for purpose of security the lid 40 can be operated only from the inside of the receiving chamber 7. With this arrangement, since the support portion for the battery 25 can be formed integral with the chamber 7, the construction is simplified. Additionally, by relocating the battery, the rear portion of the seat 8 can be extended into the space previously occupied by the battery. Also, the size of the fuel tank 26 can be increased and an oil tank 23 can now be mounted over the main frame 4.

FIG. 9 illustrates another embodiment of a motorcycle according to the present invention. In this embodiment, the body frame 102 is composed of a main frame 103 formed from a round pipe having a relatively large diameter section and a rear frame 104 formed of a rectangular pipe having a laterally extending section. The main frame 103 is inclined so as to be gradually lowered from the front end 103a toward the rear end 103b. The rear frame 104 is curved in order to avoid interference with the rear wheel 128 which will be described hereinafter. The rear end 103b of the main frame 103 is fitted into holes 105a and 105b bored in front and rear walls 104a and 104b at the lower end of the rear frame 104, as shown in FIGS. 12 and 13 and fixed by welding, or the like.

A front wheel 107 is supported on the front end 103a of the main frame 103 through a front fork 106, the front wheel 107 being steered by a handle 108.

A fuel tank-receiving frame 110 is mounted on a bracket 109 provided at the rear end of the rear frame 104, and a fuel tank 116 is provided within the frame 110.

Figure 12:
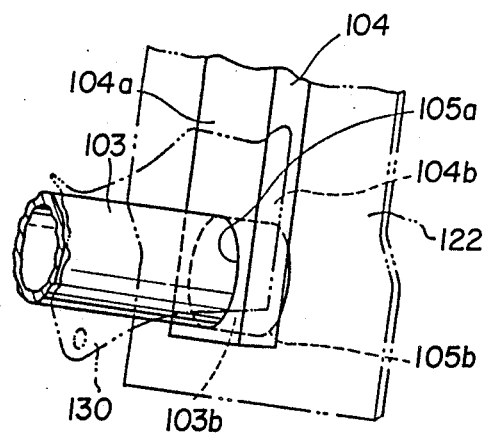
FIG. 12 is a partial perspective view illustrating the connection between the main frame and the rear frame in the FIG. 9 embodiment.
Figure 13:
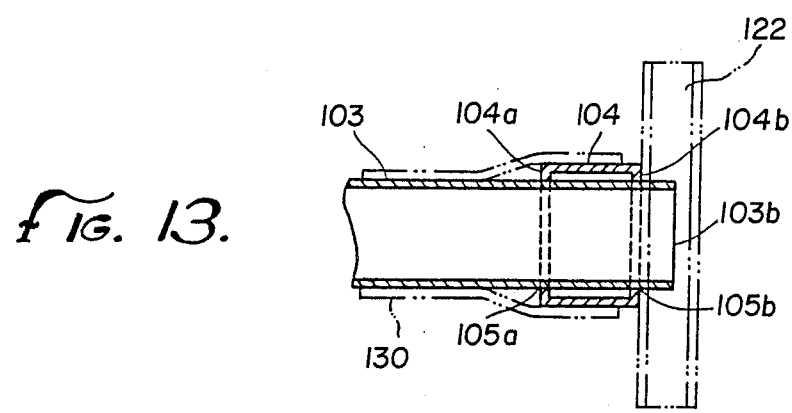
FIG. 13 is a sectional elevational view of the structure of FIG. 12.
Figure 15:
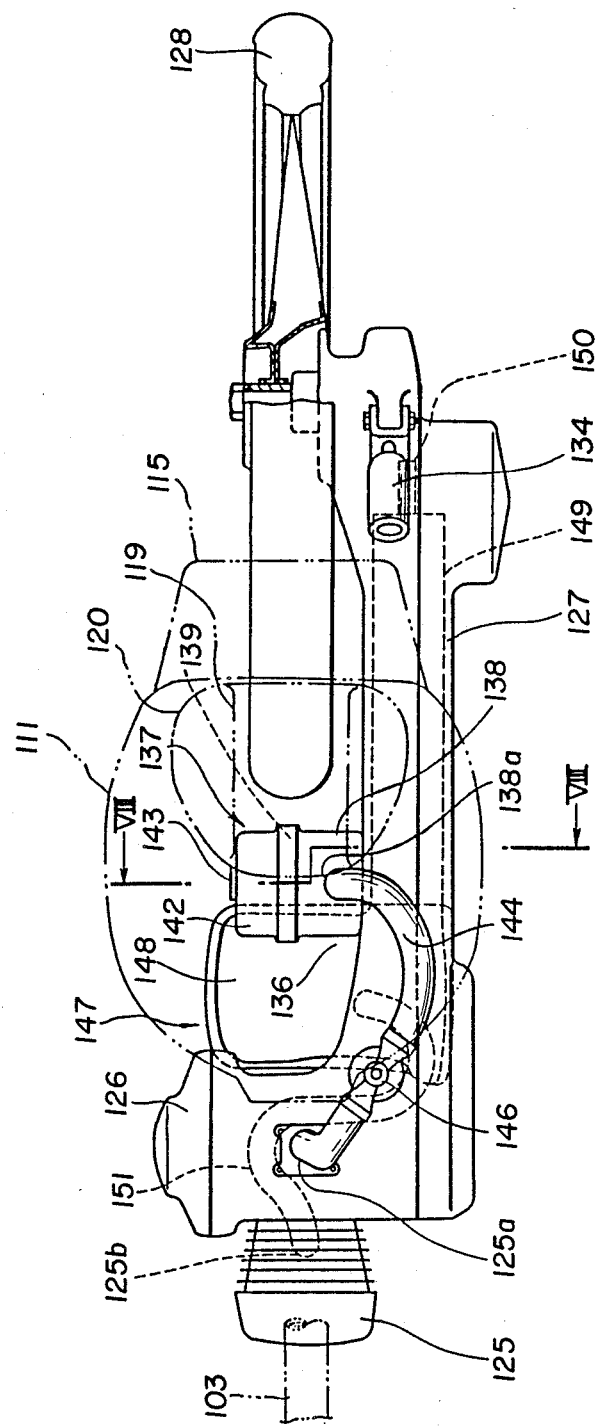
FIG. 15 is a partial view taken along line VII—VII of FIG. 9.

Upwardly from the rear portion, of an approximately intermediate portion of the body frame 102, is provided a helmet-receiving chamber 111, the upper surface of which is open as shown in FIGS. 9, 12 and 15. This receiving chamber 111 has its bottom plate extended from a forward to upward portion of the rear wheel 128, the bottom plate comprising a front bottom plate portion 111b and a rear bottom plate portion 111c. The front bottom plate portion 111b is positioned forwardly of the rear wheel 128 and secured by bolts 114a and nuts 114b to brackets 113 on both sides of the main frame 103 through rubber mounts 112 with a collar 112a fitted therein. The rear bottom plate portion 111c is inclined upwardly of the rear wheel 128 and has a rear wall 111d at the upper portion thereof. Upwardly of the front bottom plate portion 111b the front wall 111a is integrally continuously formed.

Figure 14:
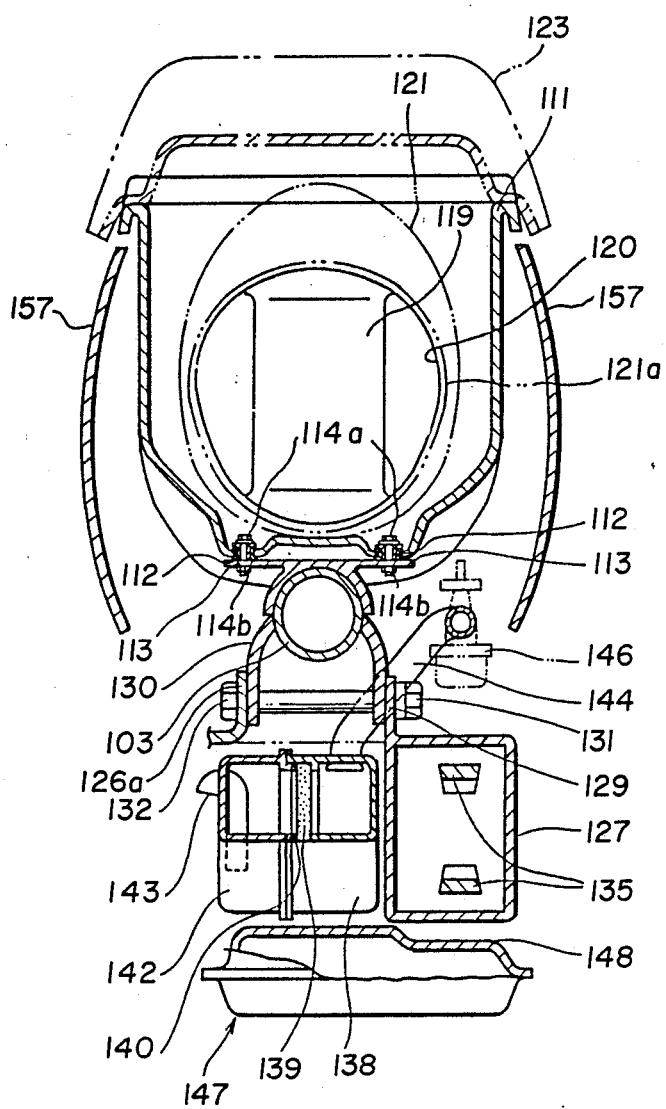
FIG. 14 is a sectional view taken along line VI—VI of FIG. 9.

In the receiving chamber 111, a mount wall 115 projecting from the rear of the upper end thereof is secured by means of bolts 117 and nuts 118 to the upper surface of the bracket 109 on the upper end of the rear frame 104 through a rubber mount with a collar 116a fitted therein. In the rear bottom plate portion 111c of the receiving chamber 111, a recess 119 for avoiding interference with the rear wheel 128 is projected into the interior of the chamber 111. The longitudinal shape of the recess 119 corresponds essentially to the rear frame 104. A projection 120 is provided inwardly of the rear bottom plate portion 111c of the chamber 111 corresponding substantially to the recess 119. This projection 120 has a shape corresponding to the shape of the peripheral edge of the lower opening 121a of a full-face type helmet 121 placed into the receiving chamber 111. As shown in FIG. 14, the shape of the projection 120 is set somewhat smaller than the shape of the peripheral edge.

The front bottom plate portion 111b of the receiving chamber 111 is provided with a support surface 160 by which the lower opening 121a of the helmet 121 is caused to be positioned toward the projection 120. This support surface 160 is formed by curving the front bottom plate portion 111b of the receiving chamber 111 into a shape corresponding to the rear curved surface 121b of the helmet 121.

Figure 19:
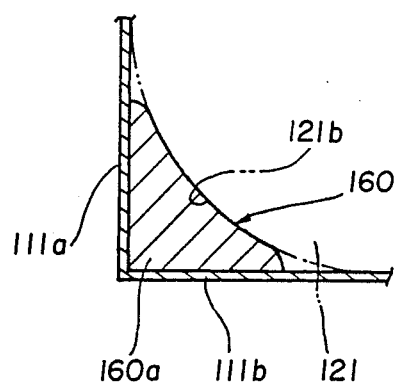
FIG. 19 is a sectional view illustrating another embodiment of a support surface according to the invention.

In the present embodiment, while the support surface 160 is constructed by forming the bottom plate into the curved surface 121b it is to be noted that, as shown in FIG. 19, the front bottom plate portion 111b can be caused to extend horizontally and a separate support member 160a provided between it and the rear curved surface 121b of the helmet 121 to thereby constitute the support surface 160.

On the rear side of the rear frame 104 is fixedly mounted a rear fender made of steel plate to strengthen the rear frame 104. At the front portion of the upper end of the receiving chamber 111, a seat 123 is provided that also serves as a lid to open and close the opening to the chamber 111. The seat 123 is pivotably mounted by a hinge mechanism 124.

An engine 125 is disposed downwardly of the body frame 102. The engine 125 has its crank case 126 integrally provided on the front end of the power transmission case 127. The rear wheel 128 is mounted on one side of the rear end of the power transmission case 127. Brackets 129 on both sides of the upper surface of the crank case 126 at the front end of the transmission case are mounted by bolts 131 and nuts 132 on reinforcing plate 130 provided along a connection corner between the main frame 103 and the rear frame 104, thereby mounting the power transmission case 127 to the body frame. The rear wheel 128 is mounted in the central portion of the rear end of the power transmission case 127. A rear cushion 134 is interposed between the upper side of the rear end of the power transmission case 127 and the lower portion at the side of the bracket 109 on the upper end of the rear frame 104. Thereby, the power transmission case 127 also serves as a cantilever rear fork since the rear end thereof swings up and down about the bolt 131.

Figure 16:
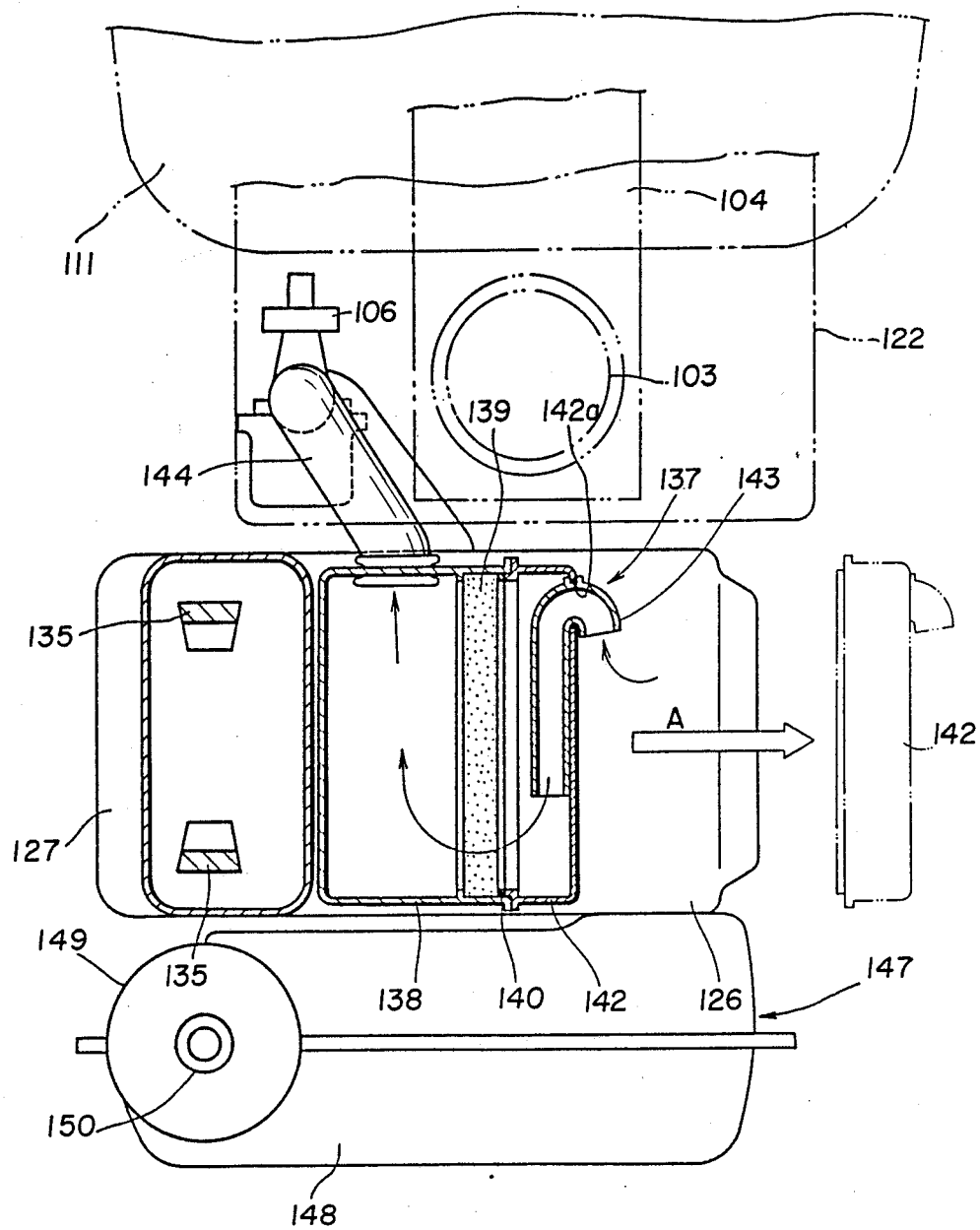
FIG. 16 is a sectional view taken along line VIII—VIII of FIG. 15.
Figure 17:
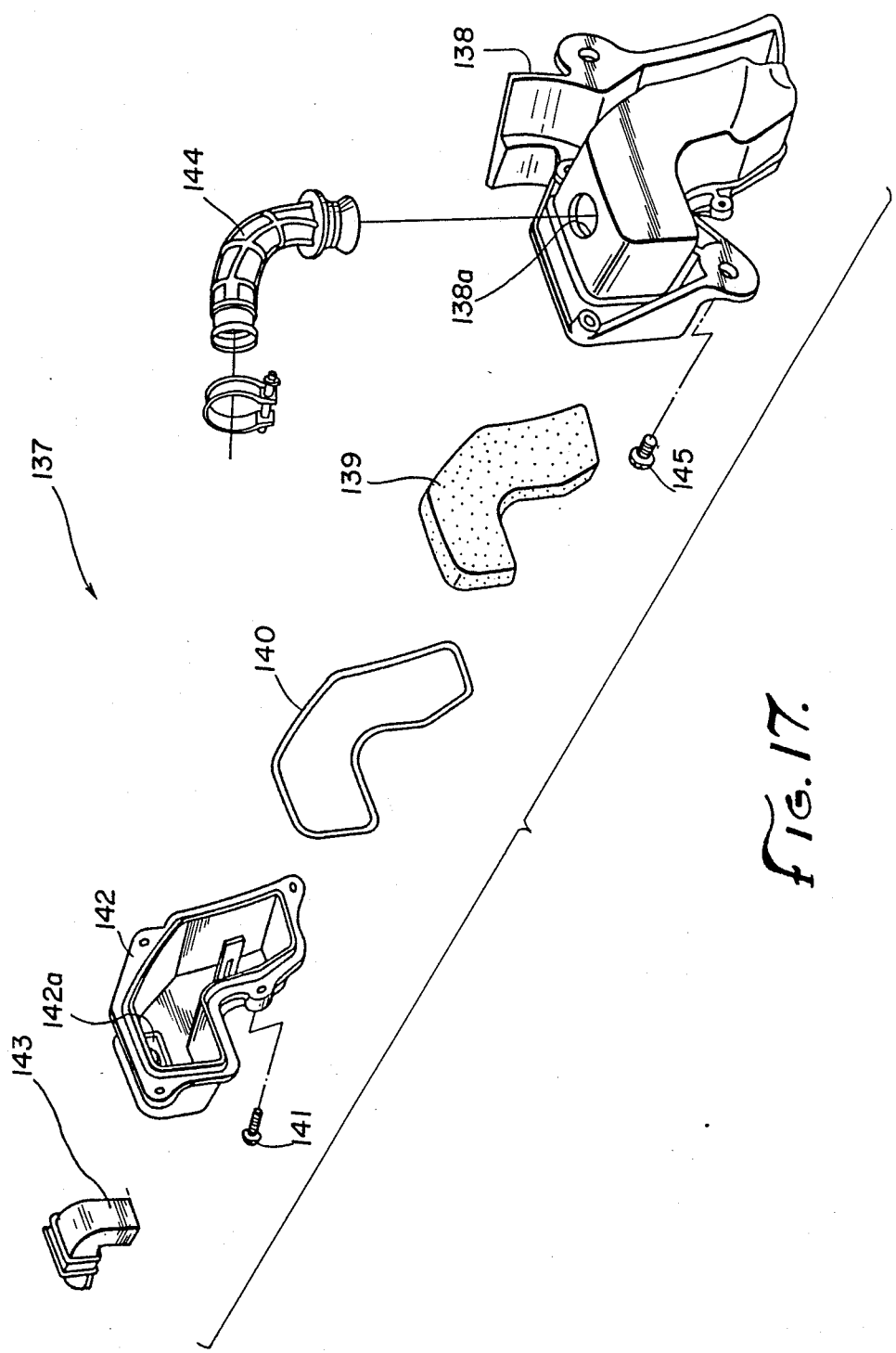
FIG. 17 is an exploded perspective view of an air cleaner incorporated in the present invention.

The turning force of the crank shaft (not shown) of the engine 125 is transmitted to the rear Wheel 128 through a stepless speed change gear (not shown) whereby the rear wheel is rotatably driven. A space 136, as shown in FIG. 15, is defined between the front side of the rear wheel 128 and the crank case 126, and an air cleaner 137 is disposed within the space 136. The air cleaner 137 comprises, as shown in FIG. 17, a case 138, a filter element 139 received within the case, a cover 142 secured by a screw 141 to the open surface of the case through a seal 140, a duct 143 connected to an air inlet 142a of the cover, and a connecting tube 144, one end of which is connected to an air outlet 138a from the case. The air cleaner 137 has a bracket 138b at the lower end of the case 138 secured to one side of the power transmission case 127 by means of a screw 145. The other end of the connecting tube 144 is connected to the intake port 125a of the engine 125 through the carburetor 146. When the air cleaner 137 requires maintenance, the cover 142 may be removed in the direction of arrow A in FIG. 16.

Figure 18:
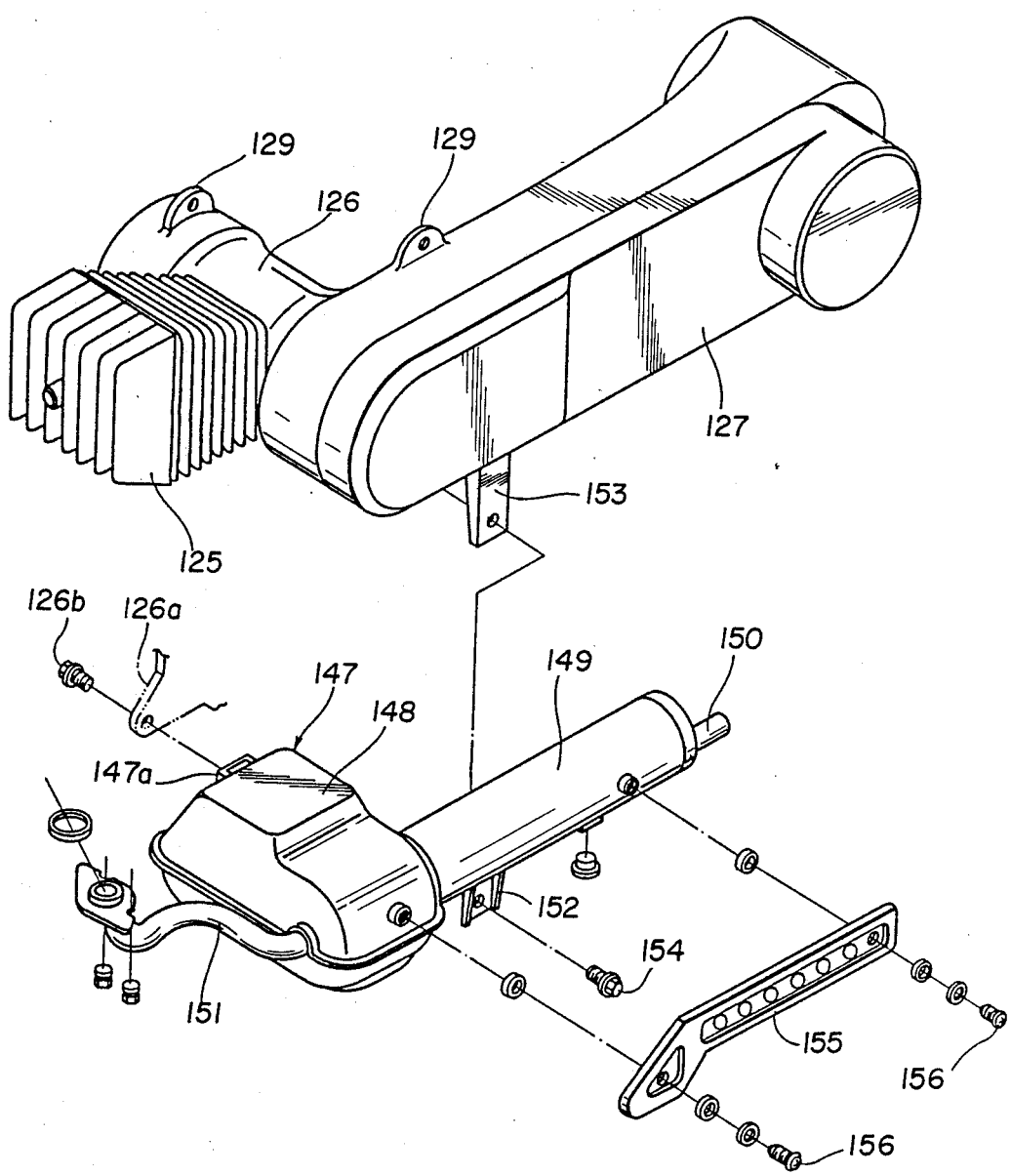
FIG. 18 is an exploded perspective view of a power transmission case and muffler utilized in the described embodiment.

A muffler 147 is disposed downwardly of the power transmission case 127. As shown in FIG. 18, this muffler 147 is composed of a first silencer chamber 148 in the form of a square box, a second cylindrical silencer chamber 149, the front end of which is connected to one side from a lateral intermediate portion of the rear side of said first silencer chamber 148, and a small diameter tail pipe 150 projecting from the rear end of the second silencer chamber 149. A connection pipe 151 extends from the front side of the first silencer chamber 148 and is connected to an exhaust port 125b from the engine 125. The first silencer chamber 148 of the muffler 147 is positioned in the vicinity of, and downwardly from, the crank case 126, as shown in FIG. 18, and a bracket 147a on one side thereof is mounted by means of a screw 126b to a bracket 126a provided on the crank case 126. The second silencer chamber 149 is disposed to be positioned below the poWer transmission case 127 from the lower portion of the crank case 126 to one side of the rear wheel 128.

The muffler 147 has a bracket 152 which projects downwardly from the second silencer chamber 149 is mounted by means of a screw 154 on a bracket 153 that projects downwardly from the power transmission case 127. In FIG. 18, the reference numeral 155 designates an ornamental member for improving the external appearance of the muffler 127. Both ends of the member 155 are mounted by means of screws 156 to the outer surface of the muffler 147. The body frame 102, the receiving chamber 111 and the fuel tank receiving frame 110 are covered with a body cover 157 made of synthetic resin. A battery case 158 is mounted to the lower side of the main frame 103.

In the described embodiment, since the air cleaner 137 is positioned forwardly of the rear wheel 128 and disposed within the space 136 defined by the power transmission case 127, detachment of the cover 142 for maintenance of the air cleaner 137 can be effected on the opposite side of the power transmission case 127, thus improving workability. Further, since the rear frame 4 is constructed of a hollow member of rectangular section whose lateral width is greater than its depth, the frame can produce a section modulus and, thereby, a structural stiffness equal to that produced by a hollow circular pipe of greater diameter. Consequently, greater clearance space between the rear wheel 28 and the rear frame 4 is made available by the described arrangement.

Moreover, since the rear end 103b of the main frame 103 is fitted into the holes 105a and 105b bored into the front and rear walls 104a and 104b of the rear frame 104, coupling of the rear portion 103b becomes positive and a space for arrangement of the receiving chamber 111 can be secured.

Furthermore, since the silencer chambers 148 and 149 of the muffler 147 are disposed below the power transmission case 127 from the lower portion of the crank case 126 of the engine 125 to one side of the rear wheel 128, the volume of the muffler 147 can be increased without lowering the height of the muffler from the ground, and when the rear wheel 128 is mounted or removed, the muffler 147 need not be removed.

According to the present invention, the receiving chamber provided under the seat is designed to fit into the space formed by the forwardly inclined engine disposed in front of the chamber and the transmission disposed substantially horizontally and extending rearwardly therefrom. Therefore, the receiving chamber can be increased in capacity while the height of the seat can be equal to, or lower than the prior art.

As described above, the motorcycle according to the present invention has a helmet receiving chamber provided below the seat, wherein a bottom plate of the receiving chamber extends obliquely from the forward to an upward portion of the rear wheel. A recess for avoiding interference with the rear wheel is provided in the inclined portion of the bottom plate. This recess defines a protrusion extending into the receiving chamber, and a support portion for supportively positioning a helmet on the front portion of the bottom plate.

Accordingly, a beneficial effect of the invention is that the diameter of the rear wheel can be increased without increasing the length of the wheel base, or the height of the seat, or without constituting an obstacle to receiving the helmet into the receiving chamber.

It should be further understood that, although the preferred embodiments of the invention have been illustrated and described herein, changes and modifications can be made therein without departing from the scope of the invention as defined by the appended claims.

What is claimed:

1. A motorcycle comprising:
   a longitudinally extending frame;
   a front wheel and a rear wheel connecting with said frame at opposite ends thereof;
   an engine;
   a transmission extending generally horizontally and rearwardly from said engine to operatively connect said engine and said rear wheel, said transmission being contained in a case that mounts said engine and that is pivotally attached to said frame;
   a box-like receiving chamber with an open upper end carried by said frame rearwardly of said engine and in overlying relation to said transmission in close proximity thereto; and
   a seat pivotally attached to said receiving chamber for opening and closing the upper end thereof.

2. A motorcycle according to claim 1 in which said frame includes a downwardly inclined front frame member and an upwardly inclined rear frame member intersecting said front frame member adjacent the lower end thereof, and means for attaching said receiving chamber between said front and rear frame members.

3. The motorcycle according to claim 2 in which said receiving chamber includes a bottom plate conforming generally to the shape of the intersection of said frame members.

4. The motorcycle according to claim 3 in which said receiving chamber bottom plate includes a rear wall portion, a depression in said rear wall forming a protrusion extending into the interior of said chamber, said protrusion being disposed for positioning a helmet for containment in said receiving chamber.

5. The motorcycle according to claim 4 in which said depression is substantially arcuately formed and disposed in generally concentric relation to said rear wheel.

6. The motorcycle according to claim 2 in which said engine is positioned forwardly of said pivotal attachment.

7. The motorcycle according to claim 1 in which said receiving chamber includes a rear wall portion inclining upwardly and rearwardly in overlying relation to said rear wheel.

8. The motorcycle according to claim 7 in which said rear wall portion is depressed interiorly of said chamber to form an exterior recess intermediate the lateral extent of said rear wall and a corresponding projection into said chamber interior.

9. The motorcycle according to claim 8 in which said recess is substantially arcuately formed and disposed in general concentric relation to said rear wheel.

10. The motorcycle according to either claim 3 or claim 7 including partition means in said receiving chamber dividing the interior thereof into an upper portion and a lower portion.

11. The motorcycle according to claim 10 including a removable cover in said partition means for closing said chamber lower portion.

12. The motorcycle according to claim 11 including means in said chamber lower portion for mounting an air cleaner therein.

13. The motorcycle according to claim 12 including a carburetor connecting with said engine and a connecting tube extending between said carburetor and said receiving chamber lower portion for establishing communication between said air cleaner and said carburetor.

14. The motorcycle according to claim 11 including means in said receiving chamber lower portion for mounting a battery therein.

15. The motorcycle according to claim 1 including a carburetor disposed forwardly of said receiving chamber and connecting with said engine, an air cleaner disposed beneath said receiving chamber intermediate said engine and said rear wheel, and a connecting tube for establishing communication between said air cleaner and said carburetor.

* * * * *